3,756,920
AUTOMATIC INSTRUMENT FOR CHEMICAL PROCESSING TO DETECT MICROORGANISMS IN BIOLOGICAL SAMPLES MY MEASURING LIGHT REACTIONS
Burton N. Kelbaugh, Lanham, Grace L. Picciolo, Tantallon, and Emmett W. Chappelle, Baltimore, Md., and Maurice E. Colburn, Arlington, Va., asssignors to the United States of America as represented by the Administrator of the National Aeronautics and Space Administration
Continuation-in-part of abandoned application Ser. No. 60,882, Aug. 4, 1970. This application Apr. 30, 1971, Ser. No. 139,094
Int. Cl. C12k 1/10
U.S. Cl. 195—127                    15 Claims

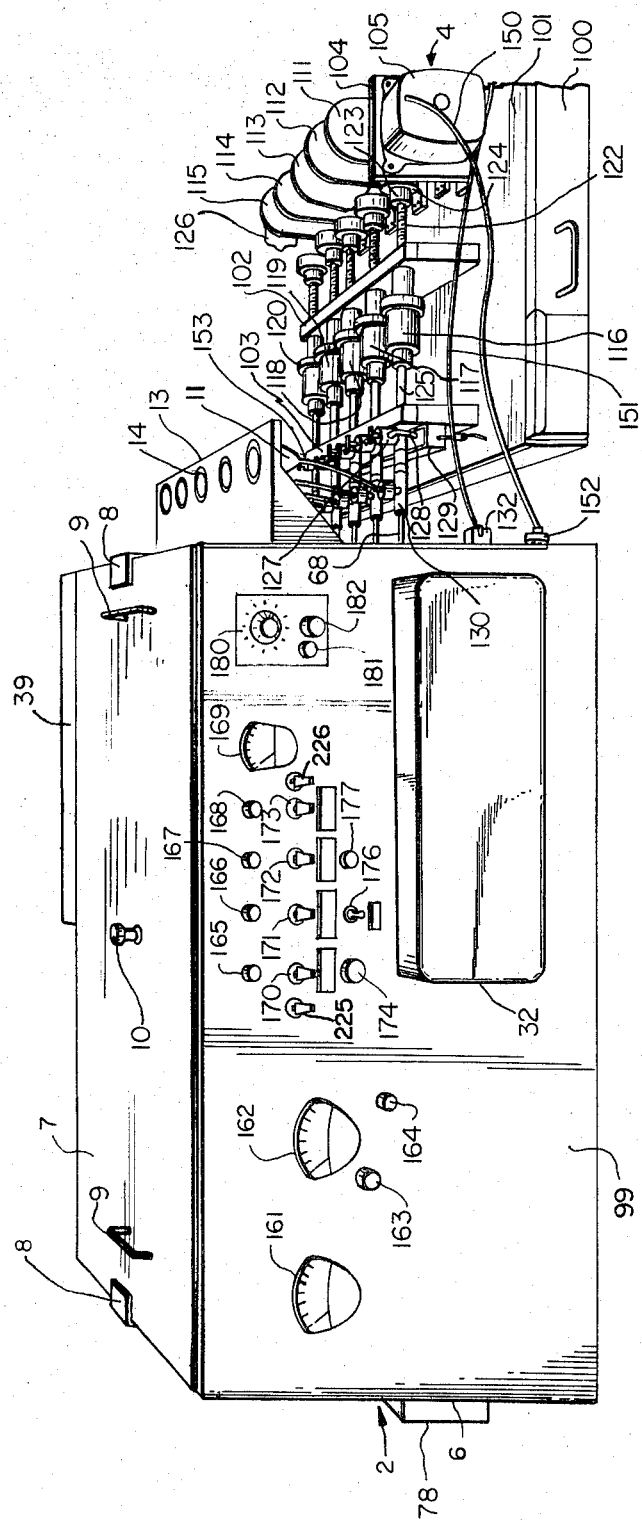
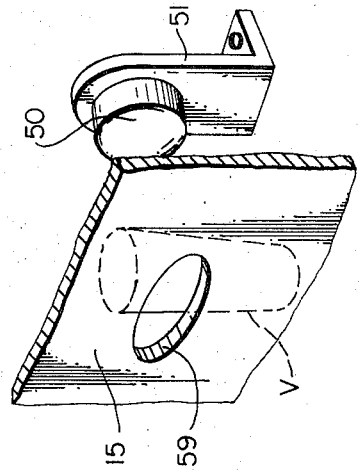
FIG. 1
FIG. 5
INVENTORS
BURTON N. KELBAUGH
GRACE L. PICCIOLO
EMMETT W. CHAPPELLE
MAURICE E. COLBURN
BY Earl Levy
ATTORNEYS United States Patent Office 3,756,920
Patented Sept. 4, 1973

ABSTRACT OF THE DISCLOSURE

An automated apparatus for sequentially assaying urine samples for the presence of bacterial adenosine triphosphate (ATP) comprises a rotary table which carries a plurality of sample containing vials; dispensing means which automatically dispense fluid reagents into the vials at predetermined times preparatory to injecting a light producing luciferase-luciferin mixture into the samples; and indicating means which automatically measure the light produced in each urine sample by a bioluminescence reaction therein of the free bacterial adenosine triphosphate with the luciferase-luciferin mixture. The light measured is proportional to the concentration of bacterial adenosine triphosphate which, in turn, is proportional to the number of bacteria present in the respective urine sample. After the light measurement is performed, the vials are ejected from the table.

---

The invention described herein was made by employees of the United States Government and may be manufactured or used by or for the United States Government for governmental purposes without the payment of any royalties thereon or therefor.

This is a continuation-in-part of a prior copending application, Ser. No. 60,882, filed Aug. 4, 1970, now abandoned.

INTRODUCTION

This invention relates to an apparatus for automatically detecting and counting the bacteria present in urine samples from which it determines the amount and extent of urinary tract infection associated with a respective urine sample. Specifically, this invention relates to a novel automated apparatus for carrying out various steps of treating the samples and for counting bacteria present in the samples through the use of an optical detector, the counting depending upon the presence and quantitive determination of adenosine triphosphate (a nucleotide present in all living matter) in the bacteria after all non-bacterial adenosine triphosphate has been destroyed during the treating of the samples.

Adenosine triphosphate, commonly referred to as ATP, is universally present in all living matter, thereby making this compound an excellent indicator of the presence of various forms of life, e.g., bacteria. Among the most sensitive methods for the quantitative assay of ATP is the ATP dependent bioluminescent reaction which occurs in nature in the firefly. In this reaction, bioluminescence occurs as a result of the reaction of ATP with a luciferase-luciferin mixture which contains divalent ions such as magnesium or manganese.

The high incidence of urinary tract infections, coupled with the serious implications of such infections, makes the analysis of urine one of the most important and frequently conducted tests carried out by clinical laboratories. Presently, a considerable expenditure in time and effort by lab clinicians is needed to conduct an accurate urine analysis; and the approaches utilized in carrying out such an analysis involve time consuming procedures which are generally not completely satisfactory.

The propose of the apparatus of the instant invention is to provide for the fast, automated detection of bacteria present in biological specimens by automatically treating the specimens and thereafter injecting into them a light producing enzyme, luciferase-luciferin mixture. The light produced from the resulting bioluminescent reaction is then measured and is correlated with the number of bacteria present in the specimen. More particularly, the treating, automatically performed by the apparatus, prepares the specimen for the bioluminescent reaction by removing all interferring substances and freeing a light-initiating substance, adenosine triphosphate, from the bacteria. Then, when the luciferase-luciferin mixture is introduced into the specimen containing free bacterial adenosine triphosphate, a light is produced which is proportional to the bacterial adenosine triphosphate present which, in turn, is proportional to the number of bacteria present. The apparatus can be used to quantitatively determine bacteria present in biological specimens within 30 minutes.

The rapid determination is facilitated, in part, by a rotary table on which a plurality of specimen samples can be continually moved through various treating steps and an assay step, these being separated in time such that different individual samples can be simultaneously run at different steps. Reagents, required in certain of the treating steps and in the assay step, are added to the samples at predetermined points around the periphery of the table, the arcuate spacing between points defining the times needed to effect corresponding steps. Means for heating and cooling the samples to carry out these particular treating steps, should they be desired, are provided at prescribed points around the periphery of the rotary table; and a supply rack is used to enable an operator to load and set the apparatus, at the maximum, at least once every hour, thereby freeing him for work elsewhere during this period of time.

DESCRIPTION OF THE PRIOR ART

Various processes have been used, up until now, to detect and count bacteria in urine samples. These include growth techniques, such as the streak plate and poor plate method; and direct methods, such as microscopic counting and another one which depends upon the ability of bacteria to reduce nitrates to nitrites. None of these processes, however, are automated, but rather require much attention by lab clinicians.

A description of these various prior art processes, as well as a full disclosure of the novel process which is automatically implemented by the instant apparatus, is found in copending continuation-in-part application, Ser. No. 139,250, entitled "Bacterial Adenosine Triphosphate as a Measure of Urinary Tract Infection," filed concurrently herewith, and which is hereby incorporated herein by reference.

Even though many other clinical laboratory procedures have been performed by automated instruments, and such instruments do include rotary tables, pumping systems, and light detecting equipment; still, the treating and assaying of urine samples for the determination of bacteria therein has not been fully automated in the manner contemplated by the instant invention.

OBJECTS

Accordingly, it is a primary object of the present invention to provide an automatic apparatus for detecting and counting bacteria in biological specimens.

Another object is to provide an apparatus for detecting and counting bacteria by utilizing a bioluminescent reaction of bacterial ATP when the sample to be analyzed contains non-bacterial sources of ATP.

A further object is to provide an apparatus for automatically treating a urine sample to remove non-bacterial ATP therefrom, and thereafter detecting and counting bacteria, in accordance with a bioluminescent reaction of bacterial ATP with a luciferase-luciferin mixture, at a rapid rate with a high degree of sensitivity and accuracy.

A further object is to provide an apparatus for automatically detecting and counting bacteria incorporating the capability of accurately identifying when the detecting and counting of the bacteria is completed.

A further object is to provide an apparatus which facilitates the fast, automated detection of microorganisms present in biological specimens by automatically both treating and thereafter injecting in the specimens a light producing enzyme.

A still further object is to provide an automated apparatus for dispensing a plurality of fluids into vials, counting the vials fed thereto, and preventing at least one of the plurality of fluids from being dispensed into at least one specified vial.

These and other objects of the present invention will become apparent with reference to the following summary of the invention and description of the drawings.

SUMMARY OF THE INVENTION

According to the present invention, there is provided an automated apparatus for implementing a novel method for detecting and counting bacteria in urine samples, which method constitutes adding to each of the samples a compound which is capable of rupturing the various non-bacterial organisms containing adenosine triphosphate without affecting the bacteria which also contain adenosine triphosphate; hydrolyzing both the released non-bacterial adenosine triphosphate and that found in a free soluble state with a suitable hydrolyzing agent followed by treatment by heating of or a chemical reaction within the sample to denature or inactivate the hydrolyzing agent, i.e., destroying its activity; acidifying the sample to lyse the bacterial cells, i.e., rupturing the bacteria walls to release the adenosine triphosphate present therein; neutralizing the acid as necessary; adjusting the hydrogen ion concentration (pH) level to that which will favor the bioluminescent reaction of adenosine triphosphate with a firefly luciferase-luciferin mixture to form a treated urine sample; adding the firefly luciferase-luciferin mixture to the treated urine sample to create a bioluminescent reaction; and recording the amount of light emitted therefrom with an optical detector.

The automated apparatus carries out the above steps automatically and includes a main light tight housing having contained therein a table assembly comprising a rotary table having openings in the periphery thereof for sequentially receiving vials containing urine samples from a feed chute. Dispensing means, having a plurality of spout means located at predetermined points with respect to the rotary table, sequentially dispense predetermined quantities of fluid reagents from the spout means into the vials as the vials pass under the respective spout means. Microswitches, upon being tripped by making mechanical contact with vials at predetermined positions of the rotary table, activate a pump assembly, forming a part of the dispensing means and located outside of but adjacent to the light tight housing, so that the pump assembly delivers prescribed quantities of fluid reagents to respective spout means, which in turn dispense the fluid reagents into respective vials. The pump assembly includes a drive means for driving a plurality of cams, equal in number to the number of spout means, when the cams are locked thereto by the action of solenoid controlled clutches, associated therewith, being activated by the microswitches; and pumps equal in number to the number of cams, for containing the fluid reagents, each of the pumps having an operating member adjustable with respect to and operated by the respective cam associated therewith, such that each pump, via a valve and tubing arrangement cooperating therewith, delivers a prescribed quantity of a specific fluid reagent to a respective spout means when a vial is below the spout means. Also contained within the light tight housing and appropriately positioned with respect to the rotary table are a heating unit and a cooling unit which perform the heating and cooling steps, respectively, as desired, of the method just described; photodetecting means, preferably a photomultiplier unit, located at a prescribed point with respect to the rotary table for detecting the light from the bioluminescent reaction created in the urine sample upon the luciferase-luciferin mixture being dispensed therein by a respective spout means; and means for ejecting each of the vials from the rotary table promptly after the bioluminescent reaction has occurred. Recording means, connected to receive an electrical output from the photodetecting means, provide a reading proportional to the number of bacteria in each urine sample. An electronic system, used in the operation of the automated apparatus, is located both within and adjacent to the light tight housing. In addition to comprising power supplies, etc., it specifically includes circuitry for permitting the counting of the number of vials fed to the rotary table as well as circuitry for preventing a specified microswitch from energizing its associated solenoid controlled clutch, thereby insuring, when predetermined vials trip that microswitch, that a specified reagent is not dispensed into the predetermined vials.

The automatic apparatus will now be described in detail with reference to the figures in which:

FIG. 1 is a perspective view of the apparatus of the invention showing the main housing, the control panel, the inlet venting enclosures, the exhaust housing, and the pump assembly;

FIG. 2 is a top view of the main housing of the apparatus of FIG. 1 with the cover plate removed, showing the arrangement of the components inside the main housing;

FIG. 3 is a cross sectional view of the table housing contained within the main housing of FIG. 2 taken along 3—3 in FIG. 2, showing the rotary table in full;

FIG. 4A is a bottom perspective view of the cover plate, which mounts on top of the table housing, showing the locations of the various microswitches which control the operation of the pump assembly;

FIG. 4B is a top perspective view of the cover plate of FIG. 4A showing the positions of the various spout means which deliver the various reagents to the vials contained within the rotary table;

FIG. 5 is a perspective view, of an alternative embodiment of that portion of the table housing whereat a bioluminescent reaction takes place, showing the slot through which light rays are passed from a vial, off the mirror, and back through the slot to be read by the photomultiplier assembly;

DESCRIPTION OF THE PREFERRED EMBODIMENT

Light tight housing assembly

Figure 6:
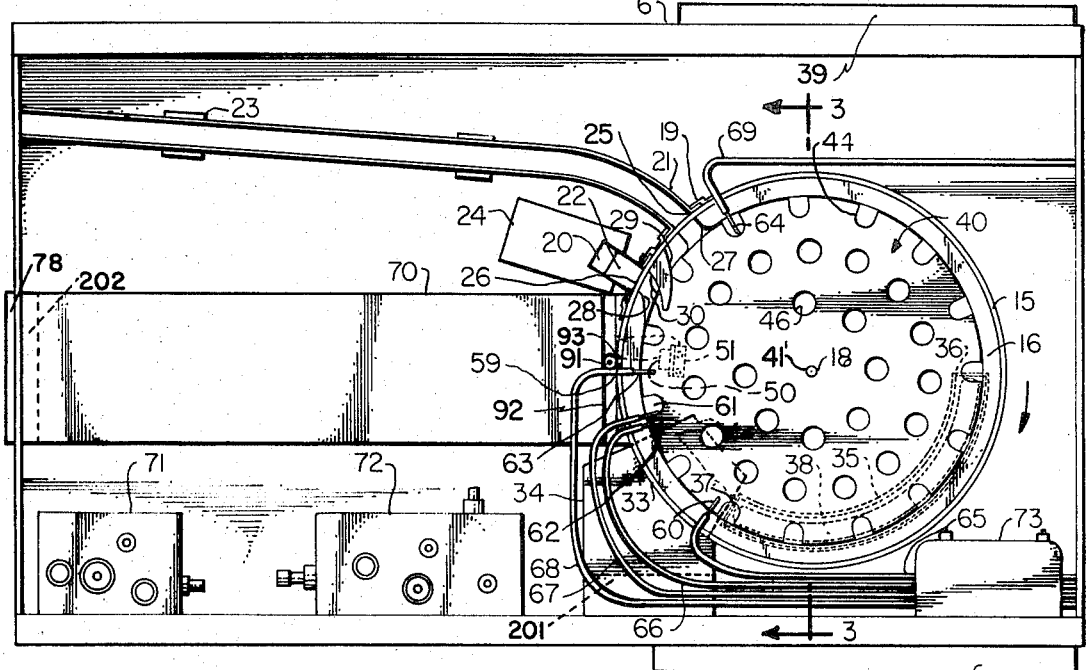
FIG. 6 is a top view of the pump assembly showing the relative positions of the cams, pumps, and valves.

Referring now to FIG. 1, there is shown generally the automated apparatus 2 consisting essentially of a rectangular housing 6 having a top 7 held thereto at the extreme edges thereof by two catches 8 to form a light-tight enclosure, thereby excluding all extraneous light. Two handles 9 are affixed to top 7 to facilitate removal of the top from housing 6 upon release of catches 8. A manually operated plunger 10, the operation of which will be described in detail hereinafter, is fastened to and passes through top 7.

Mounted on one side of the housing 6 is a horizontal support bracket 13 having a series of circular cut-outs, such as 14, for holding reagent loading reservoirs, e.g., funnels or plastic disposable syringes, such as 11, and a pump assembly 4, which will be described in detail hereinafter.

Inside of rectangular housing 6, as seen in FIGS. 2 and 3, is a circular table housing 15 having a pair of inner annular flange guides 16 and 17. A shaft 18 projects up from underneath housing 15, through a base plate 31 and through a bearing 49, housed by bearing support 48, which support is affixed to base plate 31. Shaft 18 is driven by a motor and gear train, depicted as blocks 3 and 5, respectively. Motor 3 is a 100 inch ounce synchronous motor that rotates shaft 18 once every 30 minutes.

Mounted on the outside of table housing 15, as shown in FIG. 2, are a pair of slotted brackets 19 for supporting a removable vial feed chute 21, substantially U-shaped in cross section and forming a channel with its open side up. Removable vial feed chute 21 is designed to handle more than 30 vials and is supported by a chute support 23. Feed chute 21 is aligned with a feed slot 25, cut in the wall of table housing 15, through which the vials, such as V (See FIG. 3), are fed from feed chute 21 to a rotary table 40, which rotatable table is positioned within table housing 15 and rotated by shaft 18. The feed chute 21 is preferably coated with Teflon and set at a predetermined angle from the horizontal to insure proper feeding of the vials. Two circular metal members (not shown) are placed behind the vials in feed chute 21, after the vials are positioned therein, to rotate in the channel of feed chute 21 and thereby exert pressure on the vials.

An eject chute 22 is attached adjacent to an escape slot 26, cut in the wall of table housing 15, through which the vials are ejected. Eject chute 22, a hollow tube generally rectangular in cross section, has at its far end a trap door 20 hinged thereto. Located adjacent to and below the far end of eject chute 22 is a box or container 24 for receiving vials eject chute 22 is a box or container 24 for receiving vials ejected through eject chute 22 from escape slot 26. By the use of trap door 20, any residual light emanating from a processed vial is prevented from entering table housing 15.

Flange guides 16 and 17 are broken away to form beveled cut away portions 27 and 28 to provide ingress and egress, respectively, of the vials to and from rotary table 40. Cooperating with beveled cut away portion 28 are a pair of projecting fin-shaped guide fingers 29 and 29' (See FIG. 3). These guide fingers engage the side of a vial after the processing thereof; and, as rotary table 40 continues to rotate, in the direction noted by the arrow in FIG. 2, the vial is positioned adjacent to escape slot 26.

A beryllium-copper substantially U-shaped spring 30 is secured by any suitable manner to the inner annular wall of table housing 15, adjacent escape slot 26, to insure ejection of each vial when it is positioned in front of escape slot 26. As rotary table 40 rotates, a respective vial presses against spring 30, thus loading the spring, which, when the vial is positioned in proximity with escape slot 26 by guide fingers 29 and 29', has its tension released, throwing the vial out the escape slot 26 through eject chute 22 into container 24. Trap door 20 immediately closes upon passage of the vial.

The base plate 31 of table housing 15, as seen in FIG. 3, has a series of apertures, such as 31' cut therein for admitting air up into the upper portion of table housing 15. Also mounted though table housing 15 and through base plate 31, as shown in FIG. 2, is cooling shroud 34, containing therein fan 201 (electrical connection shown in FIG. 8). Fan 201 forces cool air from the inlet of venting enclosure 32, through shroud 34, past a respective vial, and then out through venting slot 33, in the table housing 15, into the main body of rectangular housing 6, where it is circulated and finally vented out from rectangular housing 6 through exhaust housing 39, located at the back side of rectangular housing 6.

A second fan 202 (electrical connection shown in FIG. 8), mounted within and at the left side of rectangular housing 6, directs cool air from the inlet of venting enclosure 78, attached to the left side of rectangular housing 6, over and around photomultiplier assembly 70, located to the left of table housing 15, and also around table housing 15. This air, upon circulating also exhausts from rectangular housing 6 via exhaust housing 39.

A heater tube 38 is mounted on base plate 31 and is surrounded, except for the top portion thereof, by an insulation enclosure 35 with end walls 36 and 37. The enclosure 35, which is lined with asbestos, prevents heat from heater tube 38 from being applied other than to the vials passing thereover during the rotation of rotary table 40, i.e., it directs heat from heater tube 38 upward toward the vials adjacent thereto and prevents the heat from reaching other parts of the system. In the preferred embodiment, heater tube 38 is arcuate in shape and 10 inches long. It comprises a heating element (not shown) of 0.036 inch diameter Nichrome wire wound around and 8 mm. outside diameter, 1 mm. inside diameter, quartz tube. The windings of the heating element vary in linear dimensions, the first 1½ inches of windings being more closely spaced to insure that the vials, as they pass over heater tube 38, heat up more rapidly in this segment of arcuate travel of rotary table 40. Heater tube 38 also comprises an 18 mm. outside diameter, 16 mm. inside diameter, Pyrex tube having its inside surface fused with opaque silver and its outside surface coated black. This Pyrex tube encases the quartz tube-Nichrome wire combination to provide electrical insulation and protection for the Nichrome wire, and, in addition, houses quartz wool to position the quartz tube-Nichrome wire combination and to provide shock and vibration protection therefor.

As viewed in FIGS. 2 and 3, rotary table 40 comprises upper disc 41 and flanged, lower ring disc 42, each of the discs being 10 inches in diameter and being held in vertical separation by U-shaped spacers 43 attached thereto. Upper disc 41 has a hole 41' therein which receives shaft 18 and provides a friction fit therewith, thereby permitting shaft 18 to rotate rotary table 40 of which upper disc 41 is a part thereof. Although not shown, upper disc 41 can be secured to shaft 18 by other suitable means, such as by flanges and set screws. A plurality of apertures 46 are located in upper disc 41 to provide for flow of cooling air, supplied in the manner described hereinabove, to maintain the urine sample contained within the vials at a predetermined temperature.

A series of fifteen notches 44, 45, cut in upper disc 41 and lower ring disc 42, respectively, are equally spaced around the circumference thereof, 24° apart, to receive the vials (usually having 3.3 ml. capacity and containing a 0.1 urine sample) and maintain them in a vertical position. Each U-shaped spacer 43 has a projection 79 integral with its base portion, the projection fitting essentially within a notch 45, with which it cooperates, to support a respective vial. An aperture 47 is located in projection 79 of each U-shaped spacer 43 to allow heat from heater tube 38 and the cool air from fan 201 to reach the vials at predetermined positions of the vials during rotation of rotary table 40.

Preceding escape slot 26, in the direction of rotation of rotary table 40, is a light slot 59 in table housing 15. Adjacent to light slot 59, to left and outside of table housing 15, is a photomultiplier assembly 70. A shutter mechanism 91 is positioned between light slot 59 and photomultiplier assembly 70, which, when opened, permits light emanating from a vial, upon a bioluminescent reaction occurring therein when the luciferase-luciferin mixture is added to the urine sample in the vial, to pass directly to and through light slot 59 and to communicate with photomultiplier assembly 70. Photomultiplier assembly 70 is made light tight so that the only light it can detect is that coupled thereto, via light slot 59 and shutter mechanism 91, from a bioluminescent reaction occurring in only one vial.

Shutter mechanism 91 comprises a shutter plate 92 which is spring loaded by shutter spring 93 to prevent external light from impinging upon photomultiplier assembly 70 at such time as top 7 is removed from housing 6. In this manner, the life of photomultiplier assembly 70 is prolonged. When top 7 is positioned on housing 6, plunger 10 comes in contact with the top of shutter mechanism 91. Then, by the manual operation of plunger 10, shutter plate 92 is cocked to its open condition. With removal of top 7, contact between plunger 10 and the top of shutter mechanism 91 no longer exists, and shutter plate 92 returns to its closed condition.

In some instances it may be more desirable, in addition to coupling the light from the bioluminescent reaction directly to and through light slot 59, as just described, to also include, as shown in FIG. 5, a mirror bracket 51 with a mirror 50, affixed thereto, to reflect the light created in vial V back from mirror 50 through the vial V and light slot 59, to thereby reinforce the light passing directly through light slot 59.

The interior of housing 6 also includes many of the necessary electronics. For example, FIG. 2 shows the relative position of high voltage power supply 71 for the photomultiplier assembly 70; current amplifier system 72 for amplifying the output from photomultiplier assembly 70; and power supply 73 for heater tube 38. These units, as well as others forming the complete electronics, will be described in more detail in connection with FIG. 8.

Referring now to FIG. 4A, there is shown the bottom side of cover plate 80 which is adapted to be placed over rotary table 40 and attached to table housing 15. Plate 80 is substantially semi-circular in shape, being approximately a 230 degrees arc segment. It has a rounded center projection 82 containing bearing 83 through which shaft 18 passes. Secured to the bottom side of cover plate 80, located around the periphery thereof, are four microswitches 84, 85, 86 and 87. Extending from each microswitch is an activation arm 88 having an L-shaped bent portion 89 and an extension arm 90, the latter for making contact with the top side of a vial as it passes thereunder in rotary table 40.

As illustrated in FIG. 4B, with some of the components shown in phantom for ease of illustration, secured to the top sides of cover plate 80 are three single retaining members 52, 53, and 54 and one double retaining member 55. Single retaining members 52, 53, and 54 are adapted to retain Teflon tubings 69, 65, and 68, respectively, holding, in turn, spouts 64, 60, and 63, respectively, such that spouts 64, 60, and 63, although located on the opposite side of cover plate 80 from the microswitches, are positioned in close proximity with microswitches 84, 85, and 87, respectively; and double retaining member 55 is adapted to retain Teflon tubings 66 and 67, holding, in turn, spouts 62 and 61, respectively, such that spouts 62 and 61, although located on the opposite side of cover plate 80 from microswitch 86, are positioned in close proximity therewith. The various Teflon tubings connect with pump assembly 4 of FIG. 6 as will be later described.

Spout apertures 74, 75, 76, and 77, also in cover plate 80, are located such that spout 64 cooperates with spout aperture 74, spout 60 cooperates with spout aperture 75, spouts 62 and 61 cooperate with spout apertures 76, and spout 63 cooperates with spout aperture 77 so that the relationship between the spouts and the respective microswitches is maintained and so that the spouts are able to dispense the various reagents through the spout apertures, in proper sequence, into the vials as the vials pass thereunder, the dispensing of a respective reagent from each spout being controlled by a microswitch, with which a respective spout is associated, in the manner fully described hereinafter.

Each microswitch, referred to above, is located closely to the spout or the pair of spouts, as the case may be, with which it cooperates. The contacting of the extension portion 90 of the activation arm 88 of a particular microswitch with the top side of a vial, carried by rotary table 40, results in the respective spout, located above the vial and cooperating therewith, dispensing the respective reagent therein (a description of which is presented in detail below). Each of the microswitches and spout operate in the same way.

The relative positions of the various Teflon tubing and spout combinations are shown in FIG. 2, which figure, not drawn precisely to scale, merely depicts their general relationship and not the actual structural make-up as has just been described. Specifically, in the preferred embodiment, with a 0 degree reference being chosen as the point where rotary table 40 has the vials fed thereto from loading chute 21, the following exists: single retaining members 52 and 53 position spouts 64 and 60 approximately 6 degrees and 252 degrees, respectively, from the reference; double retaining member 55 position spouts 62 and 61 approximately 300 degrees from the reference; single retaining member 54 positions spout 63 approximately 312 degrees from the reference; and eject chute 22 is attached approximately 330 degrees from the reference.

With upper and lower discs 41 and 42 of rotary table 40 each having a diameter of 10 inches, a line drawn through the centers of the 15 notches 44 of upper disc 41 forms a circle having a circumference of 30 inches. Then, with rotary table 40 rotating at 1/30 r.p.m., one inch of the table circumference equals 1 minute in time. Thus, a sample is assayed every 2 minutes.

For ease of understanding the relationship of the loading chute 21, the various spouts, 64, 60, 62, 61, and 63, the heater tube 38, the cooling operation provided by fan 201 in cooperation with shroud 34, and the eject chute 22, with rotary table 40 making one revolution in 30 minutes, the following chart is presented.

|  | Degrees | Inches | Minutes |
| --- | --- | --- | --- |
| Loading chute 21 | 0 | 0 | 0 |
| Spout 64 | 6 | ½ | ½ |
| Start of heater tube 38 | 126 | 10½ | 10½ |
| End of heater tube 38 | 246 | 20½ | 20½ |
| Start of cooling operation | 246 | 20½ | 20½ |
| Spout 60 | 252 | 21 | 21 |
| End of cooling operation | 300 | 25 | 25 |
| Spouts 62 and 61 | 300 | 25 | 25 |
| Spout 63 | 312 | 26 | 26 |
| Eject chute | 330 | 27½ | 27½ |

Pump assembly

As shown in FIGS. 1 and 6, there is a pump assembly 4 located adjacent and to the right of rectangular housing 6. It comprises a base mount 100 having a planar surface 101. There are two vertical supports 102 and 103 mounted thereacross and a bracket 104 mounted thereon, the latter for supporting synchronous pump motor 105.

Pump motor 105, receiving its power via line 150 from jack 152, drives shaft 106 at 18 r.p.m. Mounted on shaft 106 are five single-stop solenoid controlled clutches 107, 108, 109, 110, and 95 which are connected to five cams 111, 112, 113, 114, and 115, respectively. When the solenoid portion of a solenoid controlled clutch is energized by a signal coupled thereto from leads from cable 151, the cable being connected to microswitch solenoid interface jack 132, the clutch portion of the solenoid controlled clutch engages shaft 106, thereby rotating the cam connected to the clutch portion of the solenoid controlled clutch. Each solenoid controlled clutch includes a means (not shown) for releasing the clutch portion from a locked position at such time as the solenoid portion is energized and the clutch portion engages the shaft. This same means again relocks the clutch, disengaging it from shaft 106 upon one revolution of the cam with which it is connected.

Cams 112 and 113, operated by solenoid controlled clutches 108 and 109, respectively, both cooperate with the same microswitch 86 (see FIG. 4A) and are slightly offset with respect to each other to provide a ½ second time interval between dispensing from spouts 61 and 62, respectively, with which they cooperate, for reasons to be described in detail hereinafter. The other microswitches 84, 85, and 87 cooperate with solenoid controlled clutches 95, 110, and 107, respectively.

Mounted securely in supports 102 and 103 are five reagent delivery pumps 116, 117, 118, 119, and 120. Pump 116, typical of the rest of the pumps, has a body portion 121, secured by support 102; a forward tube 125, secured by support 103; linearly adjustable threaded piston rod 122, having a plunger portion (not shown), located within forward tube 125; and end portion 123, attached to threaded piston rod 122, the end portion 123 having a cam engagement lip portion 124. The threaded piston rod 122 permits adjustment of the quantity of reagent, from less than 0.01 ml. to over 0.45 ml., that can be delivered by pump 116. The remaining pumps 117, 118, 119, and 120 are similarly constructed.

A petcock 127, mounted on top of forward tube 125, has a drain tube 128 extending downwardly therefrom. The petcock is necessary since it functions to exclude all air from pump 116 during the priming thereof so that there will be no variations in the quantity of reagent dispensed each time the pump is operated. In addition, it is the medium through which the pump can be flushed. A trough 129, mounted to support 103, is used to collect the reagent flushed via drain tube 128.

Connected at the extreme end of forward tube 125 is a valve assembly 130 comprising a T-shaped main body 131 with its right end connected to forward tube 125; an output nipple 133 connected to the left end of T-shaped main body 131; and an input nipple 142 connected to upright portion 134 of T-shaped main body 131.

Figure 7:
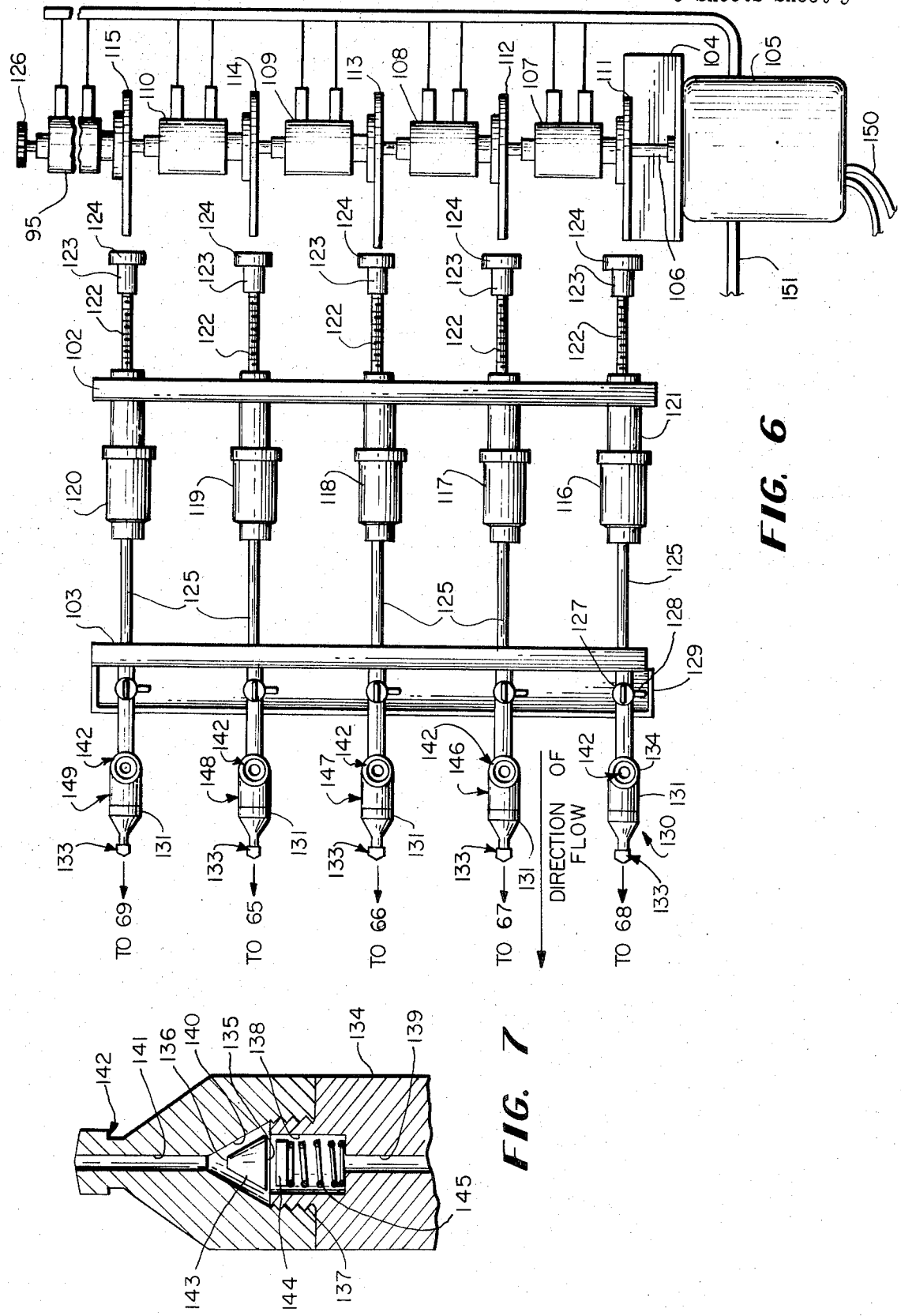
FIG. 7 is a sectional view of a portion of a valving arrangement used in the pump assembly.

As shown in detail in FIG. 7, input nipple 142 is threaded to upright portion 134 of T-shaped main body 131 at threaded portion 137. Located within threaded portion 137 is an enlarged cylindrical area 138, being in communication with lower bore 139 at its lower extremity and being in communication with conical area 140 of input nipple 142 at its upper extremity, the conical area 140 having its vertex portion 136 in communications with upper bore 141. Nestled inside of conical area 140 is tapered cone 143; and inside cylindrical area 138 is a disc 144, biased against base 135 of tapered cone 143, by coiled spring 145, which spring maintains tapered cone 143 in its uppermost position. Upon retraction of threaded piston rod 122, the arrangement of cone 143, disc 144, and spring 145 allows the reagent in funnel reservoir 11, which funnel reservoir is connected to input nipple 142 by tubing 153, to flow into upper bore 141 of input nipple 142, through conical area 140 and cylindrical area 138, to lower bore 139, to fill pump 116 via forward tube 125. On the other hand, with threaded piston rod 122 being operated to force a reagent from forward tube 125, spring 145, via disc 144, acts to again bias tapered cone 143 to block flow from funnel reservoir 11 to input nipple 142.

Output nipple 133 is constructed similarly to input nipple 142 with the exception that its internal configuration is reversed to that of input nipple 142; i.e., upon the retraction of threaded piston rod 122, output nipple 133 prevents the reverse flow from tubing 68 into pump 116 while allowing the reagent to enter T-shaped main body 131, via input nipple 142, and pass to forward tube 125 to fill pump 116. When pump 116 operates, by depressing cam engagement lip portion 124 of threaded piston rod 122, the reagent is forced through forward tube 125 and out of output nipple 133 while at the same time it is prevented from passing out of input nipple 142, as explained above.

Input nipple 142 is coupled via tubing 153 to funnel reservoir 11, placed in circular cut-out 14 in horizontal support bracket 13, as shown in FIG. 1, to receive the reagent therefrom and pass it to pump 116 upon retraction of threaded piston rod 122; and output nipple 133 is coupled, as shown in FIG. 2, via tubing 68 to spout 63 to dispense a prescribed quantity of the reagent from pump 116 into a vial, in rotary table 40, positioned below spout 63, when cam engagement lip portion 124 of threaded piston rod 122 is depressed by cam 111.

Upon solenoid controlled clutch 107 being energized, when a vial in rotary table 40 contacts extension portion 90 of activation arm 88 of microswitch 87, cam 111, cooperating with pump 116, is permitted to rotate one complete cycle. As it does so, it engages lip portion 124, moving the plunger portion of threaded piston rod 122 forward in forward tube 125 to force a prescribed amount of reagent from pump 116 past petcock 127 and out through valve assembly 130, via nipple 133 thereof, to tubing 68, wherefrom it is delivered by spout 63 to a vial located therebelow in rotary table 40. As cam 111 rotates further in its cycle, threaded piston rod is retracted and the operation as described above in connection with valve assembly 130 occurs.

The structural make up, including the connections to spout 63 and funnel reservoir 11 from pump 116, and operation, as just presented in connection with pump 116, is identical for pumps 117, 118, 119, and 120 having valve assemblies 146, 147, 148, and 149, respectively, with the exception that the specific reagents and quantity thereof dispensed by each pump is different. As shown in FIG. 6, valve assemblies 146, 147, 148 and 149 connect, respectively, with tubings 67, 66, 65, and 69. These latter tubings, as well as tubing 68, pass through the side wall of rectangular housing 6 and connect, respectively, with spouts 61, 62, 60 and 64.

Figure 10:
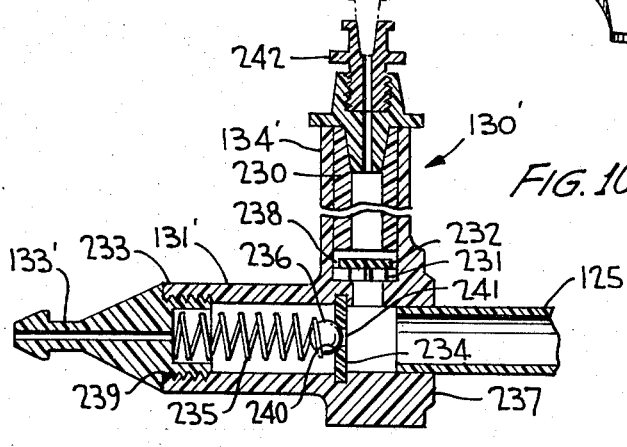
FIG. 10 is a sectional view of a portion of an alternative valving arrangement used in the pump assembly.

An alternative embodiment of valve assembly 130, as illustrated in FIG. 10, is identified by the numeral 130'. It includes a main body 131' having its right end 237 connected to forward tube 125, its left extended end 233 threaded at 239 to output nipple 133', and its upright extended portion 134' in communication with the neck portion of a plactic, e.g., polypropylene, disposable syringe 11' (an alternative reagent loading reservoir for funnel reservoir 11) through an adapter 242.

Upright, extended portion 134' is generally a hollow cylinder having a smaller diameter hollow cylinder 230 seated therein to form a cavity 238 having a plurality of projections 231 upon which is seated a diaphragm 232 of silicon rubber, e.g., General Electric RTV 60. With diaphragm 232 seated on the plurality of projections 231, the top of cavity 238 to the top of diaphragm 232 is preferably .008'' ±.001''. If this dimension be too small, there is difficulty in feeding reagent to a respective pump; and if it be too large, there is no, or at least a reduced quantity, reagent dispensed by the nozzle. The neck portion of plastic disposable syringe 11' communicates with the internal portion of smaller diameter hollow cylinder 230 via adapter 242 such that the reagent from the syringe 11' is capable of passing around diaphragm 232 and projections 231 in cavity 238 into pump 116 from forward tubing 125.

Left extended end 233 is a generally hollow cylinder having an apertured plate member 234 located therein close to the junction of the left extended end 233 with the upright extended portion 134' and substantially perpendicular to the axis of the left extended end 233. The face of the apertured plate member 234, facing output nipple 133', has a concave portion 240 in the area of aperture 241. Also located within left extended end 233 is a coiled spring 235, preferably of Elgiloy (Elgin Watch Co.), for maintaining, at one end thereof, ball 236 of silicon rubber, e.g., General Electric RTV-60, in contact with the aperture 241 of apertured plate member 234. The other end of coiled spring 235 is housed within nipple 133'.

Now, upon operation of pump 116, the reagent forced through forward tubing 125, simultaneously, closes diaphragm 232 and pushes ball 236 away from aperture 241 in apertured plate 234 so that the reagent can be passed via output nipple 133' to tubing 68 wherefrom it is delivered by spout 63 to a vial located therebelow in rotary table 40. As pump 116 again fills, diaphragm 232 opens and spring 235 maintains ball 236 in close contact with aperture 241 in aperture plate 234 so that the reagent passes from plastic disposable syringe 11' around diaphragm 232 and projections 231 in cavity 238 via forward tubing 125 to pump 116.

While specific materials are identified above for disposable syringe 11', diaphragm 232, ball 236, and coiled spring 235, these are merely examples. It should be understood that the main requirement for the selection of the materials for these units are that they be of a type that will be compatible with the reagents being dispensed.

Knob 126, shown in FIGS. 1 and 6 and connected to the end of shaft 106, can be used to manually rotate shaft 106 if it is desired to operate the delivery pumps 116–120 or to bleed or flush the valve assemblies 130, and 146–149 manually.

Control system

Figure 8:
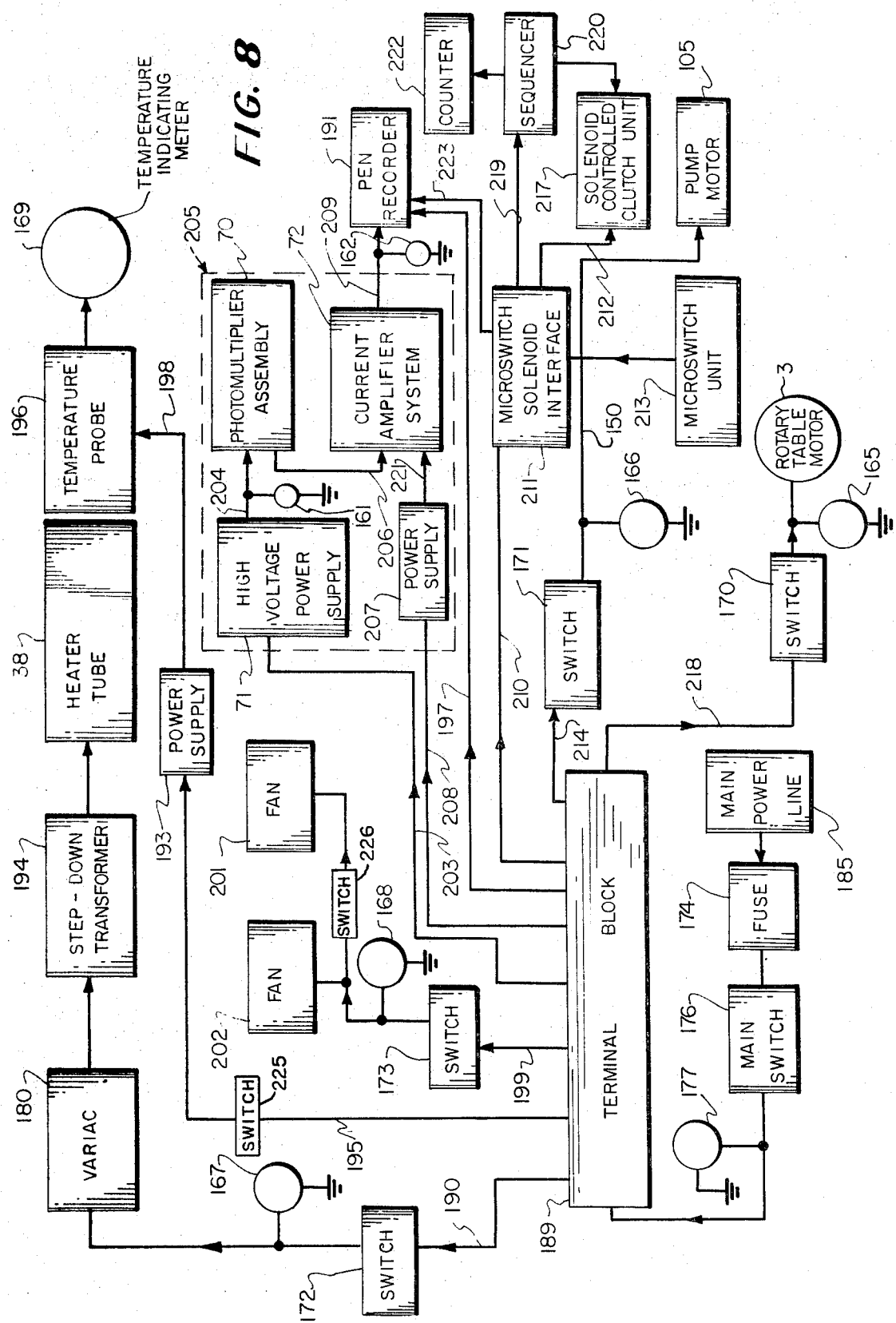
FIG. 8 is a block diagram of the electrical circuitry of the apparatus.

Referring now to FIG. 8, there is shown the block diagram of the electrical control system used to operate the automated apparatus of the invention. Main power line 185 is connected through fuse 174 and main switch 176 to pilot light 177 and terminal block 189. The power furnished by power line 185 to terminal block 189 is delivered, via lines from terminal block 189, to the various electrical operating units of the control system.

Line 190 is connected through heater switch 172, Variac 180, and step-down transformer 194 to heater tube 38. Pilot light 167 is connected to heater switch 172. Variac 180 and step-down transformer 194 cooperate to provide the correct voltage to heater tube 38. As shown in FIG. 1, Variac 180 has its own fuse 182 and pilot light 181.

Temperature probe 196, including a thermistor (not shown), has power delivered thereto by power supply 193 via line 198, power supply 193, in turn, being connected to terminal block 189 via temperature probe power switch 225 in line 195. Temperature probe 196 is positioned in close proximity to heater tube 38 register the heat generated thereby. A temperature indicating meter 169, calibrated to read 100° C. full scale, is connected to temperature probe 196.

Line 199 is connected via fan switch 173 to pilot light 168 and fans 201 and 202, the former fan through cool switch 226, to furnish power to the fans so that they cool the automated apparatus as previously described. Fan 201 has a separate cool switch 226 so that fan 202 can be operated alone should this be desired.

Two lines, lines 203 and 208, connect from terminal block 189 to photomultiplier system 205 to furnish power thereto; and another line 197 connects from terminal block 189 to a pen recorder 191. Photomultiplier system 205 includes photomultiplier assembly 70 for detecting the light emanating at such time as the bioluminescent reaction occurs; and a current amplifier system 72 is connected, via line 206, to photomultiplier assembly 70 for amplifying the output of photomultiplier assembly 70. The output voltage from current amplifier system 72 is applied to pen recorder 191 via line 209.

Also included as part of photomultiplier system 205 is a high voltage power supply 71, connected between terminal block 189 and photomultiplier assembly 70 by lines 203 and 204, respectively; and power supply 207, connected between terminal block 189 and current amplifier system 72 by lines 208 and 221, respectively. Voltmeters 161 and 162, shown positioned in FIG. 1 on panel 99 of rectangular housing 6, are connected to indicate the outputs from high voltage power supply 71 and current amplifier system 72, respectively.

High voltage power supply 71 is capable of delivering approximately $-1500$ v. at about 5 ma. to photomultiplier assembly 70 and has an output voltage regulation better than $\pm \frac{1}{2}\%$ for line variations of 105 v. to 132 v. It includes, although not shown, a step-down transformer, diode bridge, and capacitor, which components provide a primary buss of about 25 v. for a DC-AC inverter operating in the 20 kHz.–40 kHz. range. The output of the inverter is rectified and filtered by a diode bridge and capacitors to be developed into the output of high voltage power supply 71. A portion of this latter output is fed back to a comparator where it is compared with a highly stable reference voltage. The comparator's output is applied to a pass transistor which, in turn, controls the primary buss to adjust the voltage fed thereby to the DC-AC inverter. Adjustment of the output from the high voltage power supply 71 is accomplished by varying the reference voltage fed to the comparator.

In current amplifier system 72, the output current from photomultiplier assembly 70 is fed to a chopper stabilized DC amplifier which has a feedback loop of selectable resistors ranging in value from $10^4$ ohms to $10^8$ ohms so that the output (in volts) of current amplifier system 72 is equal to output current (in amperes) of the photomultiplier assembly 70 times the resistance (in ohms) of a selected feedback resistor. The selection of the resistor, accomplished by switch 163, the location of which is shown in FIG. 1, determines the sensitivity of current amplifier system 72. With the configuration of current amplifier system 72, as just described, it has its highest sensitivity with a $10^8$ ohms resistor in its feedback loop. So connected, an output of 1 volt from current amplifier system 72 would be indicative of an output of $10^{-8}$ amperes from photomultiplier assembly 70. A transistor, shunting the feedback loop, limits the excursion of the output of current amplifier system 72 to about $+10.5$ v. and $-.5$ v. by the transistor base-emitter characteristics.

Provisions are made through the use of a potentiometer 164 (shown positioned on panel 99 in FIG. 1), included as a part of current amplifier 72, to inject a current into the summing node of current amplifier system 72, which current is of opposite polarity to the output current from photomultiplier assembly 70. This injected current can be made equal to the current from the photomultiplier, thereby effectively cancelling any unwanted current from photomultiplier assembly 70 and establishing the zero level of pen recorder 191, connected to current amplifier system 72 via line 209.

Line 210, from terminal block 189, is connected to microswitch solenoid interface 211 to furnish power thereto. Microswitch unit 213, comprising microswitches 84, 85, 86, and 87, described above in connection with FIG. 4A, is electrically connected to microswitch solenoid interface 211. Three outputs from microswitch solenoid interface 211, those associated with microswitches 85, 86, and 87, are coupled, via line 212, directly to solenoid controlled clutch unit 217 to interconnect with solenoid controlled clutches 107, 108, 109 and 110 thereof; and a fourth output from microswitch solenoid interface 211, that associated with microswitch 84, is coupled via line 219 to sequencer 220, which in turn has two outputs, one of which is connected to counter 222 and the other of which is connected to solenoid controlled clutch 95 of solenoid controlled clutch unit 217.

Microswitch solenoid interface 211 houses a DC power supply, capacitors to be charged therefrom, and relays (not shown), there being a capacitor and relay network associated with each microswitch 84, 85, 86, and 87. Taking one mocroswitch, for example, microswitch 87, upon closing the microswitch by a vial contacting extension portion 90 of the activation arm 88, the capacitor associated with microswitch 87 discharges through the appropriate relay so that the AC power, at the relay's previously opened contacts, is passed by the contacts, upon the contacts being closed with the relay being energized, to the appropriate solenoid controlled clutch 107. The solenoid controlled clutch is energized only for the closure time of the relay, which closure time is related to the $R$ (relay)/$C$ time constant. This closure time is independent of the closure time of the microswitch as long as the closure time of the microswitch exceeds the $R$ (relay)/$C$ time constant. As soon as solenoid controlled clutch 107 is energized, it engages shaft 106 of motor 105, and cam 111, attached to solenoid controlled clutch 107, rotates one revolution as described above in connection with FIG. 6. This same operation, as presented in connection with microswitch 87 and its respective cam 111, is performed, in turn, by the other microswitches and their associated cams when the other microswitches are tripped by a vial making contact with their activation arms 88, except for the variation as will be described in connection with microswitch 84.

In the preferred embodiment, microswitch solenoid interface 211 selects only one microswitch of microswitch unit 213, namely microswitch 84, to cooperate with to apply an AC signal of prescribed duration to sequencer 220, and it does this each time microswitch 84 is tripped. Sequencer 220, comprising a step-down transformer, a bridge rectifier, a capacitor, and an electrically operated 12 position stepping switch, programs the operation of solenoid controlled clutch 95 of solenoid controlled clutch unit 217 in accordance with the stepping switch and provides, from across the capacitor, a DC pulse to counter 222. Accordingly, since a DC pulse is provided to counter 222 each time microswitch 84 is tripped, counter 222 indicates the number of vials, in rotary table 40, passing under microswitch 84.

The programming function carried out by sequencer 220 is determined by the positioning of the switching elements of the electrically operated 12 position stepping switch. Thus, in accordance with the switching arrangement selected, solenoid controlled clutch 95 of solenoid controlled clutch unit 217 may be activated by each tripping of microswitch 84 of microswitch unit 213 or by every second, third, fourth, sixth, or twelfth tripping of microswitch 84. As a matter of fact, the switching elements can be so set up to totally prevent operation of solenoid controlled clutch 95. Accordingly, then, sequencer 220 applies an AC signal to solenoid controlled clutch 95 of solenoid controlled clutch unit 217, and therefore allows cam 115 to rotate one revolution, only as prearranged by the electrically operated 12 position stepping switch, since it is from this switch wherefrom solenoid controlled clutch 95 derives its AC signal. With sequencer 220 operating as just described, a known quantity of ATP in solution can be carried in a vial by rotary table 40, with such vial being in a preselected position relative to vials carrying urine samples, and not have the reagents, involved with the destruction of the non-bacterial ATP, added thereto. In this manner, in addition to indicating the quantity of bacteria in a urine sample, the automated apparatus can also be used to periodically check itself out.

While not mentioned previously, microswitch solenoid interface 211 also includes a relay which, when microswitch 87 of microswitch unit 213 is tripped, is enregized to close its contacts and thereby allow a low power DC signal to pass from microswitch solenoid interface 211, via line 223, to pen recorder 191. In this manner, pen recorder 191 is provided with the capability of indicating a mark each time microswitch 87 is tripped.

Line 214 from terminal block 189 connects to pump motor switch 171 which, in turn, is connected by line 150 to both pilot light 166 and pump motor 105, the latter which continually rotates shaft 106 as long as switches 171 and 176 are closed.

Also connected to terminal block 189 is line 218 which is connected through rotary table motor switch 170 to pilot light 165 and rotary table motor 3.

The various control and indicating components such as switches, pilot lights, fuses, and meters, referred to in the above description, are located on control panel 99 of rectangular housing 6, as shown in FIG. 1, with each of the components bearing the same identifying numbers as just used in the above description.

Operation

Before going into the details of the operation of the automated apparatus, it will be well to discuss certain preliminaries which should be done in initially setting it up.

First, each funnel reservoir 11 is filled with the particular fluid reagent which is to be fed thereby to the respective pump, i.e., the funnel reservoir cooperating with pump 120 is filled with a fluid reagent consisting essentially of a mixture of compounds capable of selectively rupturing the various non-bacterial cells containing ATP and then destroying both the released ATP and that ATP found in a free soluble state without affecting the bacteria in the urine sample which also contain ATP, such a mixture, for example, including a substantially equal quantity of a 0.5% concentration of Triton X-100 (Rohm and Haas Corporation octyl phenoxy polyethoxyethanol) and potato apyrase (an ATP hydrolyzing enzyme); the funnel reservoir cooperating with pump 119 is filled with a bacterial rupturing acid, for example, 0.5 N perchloric acid; the funnel reservoir cooperating with pump 118 is filled with a neutralizing base reagent, for example, 0.5 N potassium hydroxide; the funnel reservoir cooperating with pump 117 is filled with a buffering agent, for example, TES buffer [N-tris (hydroxymethyl) methyl-2-aminoethane sulfonic acid], to adjust the hydrogen ion concentration and thereby maintain a pH at about 7.4; and the funnel reservoir cooperating with pump 116 is filled with a luciferase-luciferin mixture containing magnesium. It is to be noted that the fluid reagent mixture of Triton X-100 and potato apyrase, dispensed by pump 120, is throughly mixed before being poured into the funnel reservoir cooperating with this pump.

After the proper reagent is poured into each of the funnel reservoirs 11, it is then necessary to fill each pump with the particular reagent it is to dispense, bleed the air from each pump, and adjust each pump so that it will dispense a prescribed quantity of reagent. Taking pump 116 as typical, these functions are accomplished by manually depressing cam engagement lip portion 124 of adjustable threaded piston rod 122 and then releasing same to fill pump 116 from the funnel reservoir 11 cooperating therewith, via tubing 153, nipple 142 and T-shaped main body 131 of valve assembly 130, and forward tubing 125 of pump 116. Thereafter, pet cock 127 is alternately opened and closed and the cam engagement lip portion 124 is operated until air bubbles no longer appear in the forward tube 125 of pump 116. When this condition is reached petcock 127 is closed and adjustable threaded piston rod 122 is adjusted, by threading it either inwardly or outwardly as the situation may require, until the prescribed quantity of reagent is dispensed from spout 63, the determination being made, for example, by weighing the quantity of reagent dispensed via spout 63 and then adjusting piston rod 122 until the proper quantity is dispensed. In turn, each of the pumps 117, 118, 119 and 120 are also adjusted. More specifically, with each of the vials containing 0.1 ml. of urine sample, pumps 120, 119, 118 and 117 are each adjusted to dispense 0.02 ml. of reagent, and pump 116 is adjusted to dispense 0.4 ml. of reagent.

Once all the pumps are adjusted to dispense, via the respective spouts, the prescribed amount of reagent, each of the funnel reservoirs are again filled, followed by the various switches being turned on, i.e., main switch 176, rotary table switch 170, pump motor switch 171, fan switch 173, cool switch 226, heater switch 172 and temperature probe power switch 225 are positioned in their on position. After temperature indicating member 169 shows that the temperature of heater tube is at 95° C., rotary table switch 170 is turned off; and removable vial feed chute 21, previously loaded with the vials, each containing a 0.1 ml. urine sample, is positioned in slotted brackets 19 and chute support 23. Two circular metal members (not shown) are placed behind the vials in feed chute 21 to rotate therein and thereby exert pressure on the vials. Next, top 7 is placed on rectangular housing 6 and fastened thereto by catches 8 to form a light tight enclosure with rectangular housing 6. Then manually operated plunger 10 is depressed to contact shutter mechanism 91, forcing spring loaded shutter plate 92 downwardly, to thereby allow light to be transmitted from inside circular table housing 15, via light slot 59, to photomultiplier assembly 70. Immediately rotary table switch 170 is again turned on and the automated apparatus is in operation.

It should be pointed out that rotary table 40 can be damaged by heater tube 38 if rotary table 40 is kept in a stationary position too long. The time required to load the vials into rectangular housing 6 and place top 7 thereon is insufficient to cause any damage, of the type just referred to, so long as rotary table switch 170 is promptly put in its on position.

Following the course of one vial V as it is processed, it can be seen that it initially enters from feed chute 21, travels through feed slot 25 in circular table housing 15, and enters a particular pair of notches 44 and 45 of rotary table 40.

After a short period of time, about ½ minute, the rotation of rotary table 40, by gear train 5 and motor 3, brings the top side of the vial in contact with extension portion 90 of activating arm 88 of microswitch 84. In this instance, sequencer 220 has been set such that, each time microswitch 84 is tripped, an AC signal is passed, via microswitch solenoid interface 211 and sequencer 220, to solenoid controlled clutch 95 of solenoid controlled clutch unit 217. Accordingly, upon extension portion 90 being contacted, microswitch solenoid interface 211 couples an AC signal via sequencer 220 to solenoid controlled clutch unit 217. With the AC signal applied to solenoid controlled clutch 95, solenoid controlled clutch 95 becomes energized and engages shaft 106, driven by motor 105, causing shaft 106 to rotate cam 115, which, in turn, pushes against cam engagement lip portion 124 of end portion 123 of threaded piston rod 122 of pump 120, thereby driving pump 120 to eject the fluid reagent, Triton X–100 and potato apyrase, therefrom, through forward tube 125, T-shaped main body 131 and nipple 133 of valve assembly 149, and tubing 69, out of spout 64 into the urine sample in the vial. In addition to sequencer 220 coupling an AC signal to solenoid controlled clutch 95, it simultaneously applies a pulse to counter 222 whereat it is registered as a first count.

The urine sample in the vial, which now contains the fluid reagent, Triton X–100 and potato apyrase, dispensed by spout 64, is maintained at ambient temperature, approximately 25° C., by the air circulating about the vial via apertures 46 and 47 through the operation of fans 201 and 202. It is kept at this temperature for about 10 minutes, a time sufficient for the Triton X–100 to rupture the non-bacterial cells and the potato apyrase to hydrolyze the released non-bacterial ATP and that ATP found in a free soluble state.

At the end of the 10 minutes, rotary table 40 positions the vial adjacent to heater tube 38 which heats the sample therein to approximately 95° C. Rotary table 40 takes about 10 minutes to pass through the influence of heater tube 38. This time is sufficient for the potato apyrase (hydrolyzing enzyme) to be denatured.

As rotary table 40 continues its travel, it positions the vial adjacent to the opening of cooling shroud 34 in base plate 31 such that the cool air is passed thereby through aperture 47 in projection 79 of spacer 43 to the vial to start the cooling of the sample therein to ambient temperature of about 25° C.

Shortly thereafter, about ½ minute, rotary table 40 brings the top side of the vial, still under the influence of cooling, in contact with extension portion 90 of activating arm 88 of microswitch 85 so that the microswitch is tripped, thereby permitting an AC signal to pass vial microswitch solenoid interface 211 to solenoid controlled clutch 110 of solenoid controlled clutch unit 217. With the AC signal applied to solenoid controlled clutch 110, the solenoid controlled clutch 110 becomes energized and engages shaft 106 causing it to rotate cam 114, which, in turn, pushes against cam engagement lip portion 124 of end portion 123 of threaded piston rod 122 of pump 119, thereby driving pump 119 to eject the fluid reagent, perchloric acid, therefrom, through forward tube 125 thereof, T-shaped main body 131 and nipple 133 of valve assembly 148, and tubing 65, out of spout 60 into the urine sample in the vial. Cooling continues for about 4 minutes after the perchloric acid has been added, during which time the perchloric acid ruptures the bacterial cells to release the ATP therefrom.

Next, as rotary table 40 continues its travel, the top side of the vial contacts extension portion 90 of activating arm 88 of microswitch 86 to trip microswitch 86, thereby permitting an AC signal to pass via microswitch solenoid interface 211 to solenoid controlled clutches 109 and 108 of solenoid controlled clutch unit 217 to energize them so that they engage shaft 106, causing it to rotate cams 113 and 112, which, in turn, push against cam engagement lip portions 124 of end portions 123 of threaded piston rods 122 of pumps 118 and 117, respectively, to drive these pumps. As mentioned previously, cams 113 and 112 are out of phase sufficiently to allow for a ½ second interval between the dispensing of the potassium hydroxide from pump 117 through forward tube 125 thereof, T-shaped main body 131 and nipple 133 of valve assembly 146, and tubing 67, out of spout 61 and the dispensing of the TES buffer, N-tris (hydroxymethyl) methyl-2-aminoethanesulfonic acid, from pump 118 through forward tube 125 thereof, T-shaped main body 131 and nipple 133 of valve assembly 147, and tubing 66, out of spout 62, sequentially into the urine sample in the vial. In this manner, the potassium hydroxide has an opportunity to neutralize the perchloric acid prior to the TES buffer being added to adjust the hydrogen ion concentration, the pH to 7.4, to a level favoring a bioluminescent reaction with the luciferase-luciferin mixture.

Then, after about 1 minute, rotary table 40 carries the vial so that the top side thereof contacts extension portion 90 of activating arm 88 of microswitch 87 to trip the microswitch, thereby permitting an AC signal to pass via microswitch solenoid interface 211 to solenoid controlled clutch 107 of solenoid controlled clutch unit 217 to energize solenoid controlled clutch 107 so that it engages shaft 106, causing it to rotate cam 111, which, in turn, pushes against cam engagement lip portion 124 of end portion 123 of threaded piston rod 122 of pump 116 to drive the pump to eject the fluid reagent luciferase-luciferin mixture therefrom, through forward tube 125 of pump 116, T-shaped main body 131 and nipple 133 of valve assembly 130, and tubing 68, out of spout 63 into the urine sample in the vial.

Immediately, if bacterial ATP is present in the urine sample, a bioluminescent reaction occurs, resulting in the emission of light rays which are passed via light slot 59, in table housing 15, to the photomultiplier assembly 70. Photomultiplier assembly 70 converts the light rays into electrical signals which are amplified by current amplifier systems 72 and thereafter applied to pen recorder 191 whereat they are recorded as an accurate measure of the ATP in the sample which is accordingly a measure of the bacteria in the sample.

Simultaneously, with microswitch 87 applying an AC signal to solenoid controlled clutch 107 via microswitch solenoid interface 211, microswitch solenoid interface 211 also passes a low power DC signal to pen recorder 191 so that a mark is recorded thereon which is indicative that microswitch 87 has been tripped by a vial making contact with its activating arm 88.

Immediately, rotary table 40 moves the vial against the pair of projecting fin-shaped guide fingers 29 and 29', which fingers engage the side of the vial and position it adjacent to escape slot 26 and in contact with U-shaped spring 30 with the further rotation of rotary table 40. By action of U-shaped spring 30, the vial is ejected out escape slot 26 through eject chute 26 past trap door 20 into container 24. Trap door 20 closes immediately upon passage of the vial. As mentioned previously, by this means of ejecting the vial, any light emanating therefrom, after the assaying of the sample in the vial, is prevented from entering the table housing 15 and giving an erratic reading with respect to a succeeding vial to be assayed.

The same operation of automated apparatus 2, as just presented with respect to one vial, continues in turn, with each of the vials loaded in vial feed chute 21 until the vial feed chute is empty.

Should it be desired that the samples be contained intact in the vials, after the vials are ejected from rotary table 40, there can be added, just prior to the ejection stage, a mechanism for applying a cap to each vial. Further, in instances where the vials with the urine samples will be in the automated apparatus more than about an hour before they will be assayed, a refrigeration means can be provided adjacent to the feed chute to prevent growth of bacteria in the urine sample.

ALTERNATIVE EMBODIMENT

While the invention has been described as having heating means (heater tube 38) for heat denaturing the ATP hydrolyzing enzyme ATPase (potato apyrase) and a cooling means (fan 201 and associated structure) to bring the sample back to ambient temperature, these units, as well as the stage for adding the base (potassium hydroxide solution) to the sample for neutralizing the perchloric acid, need not be utilized if not more than ten seconds elapses between the addition of the buffer and the addition of the luciferase-luciferin mixture.

Figure 9A:
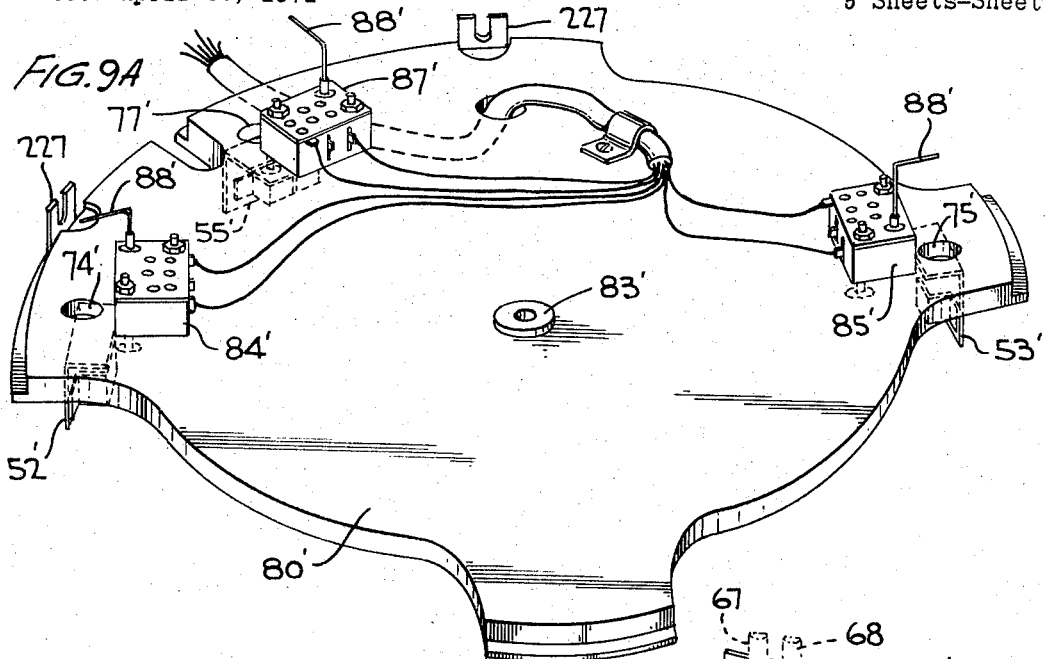
FIG. 9A is a bottom perspective view of a replacement cover plate, which mounts on top of the table housing, showing the location of the various microswitches which control the operation of the pump assembly.
Figure 9B:
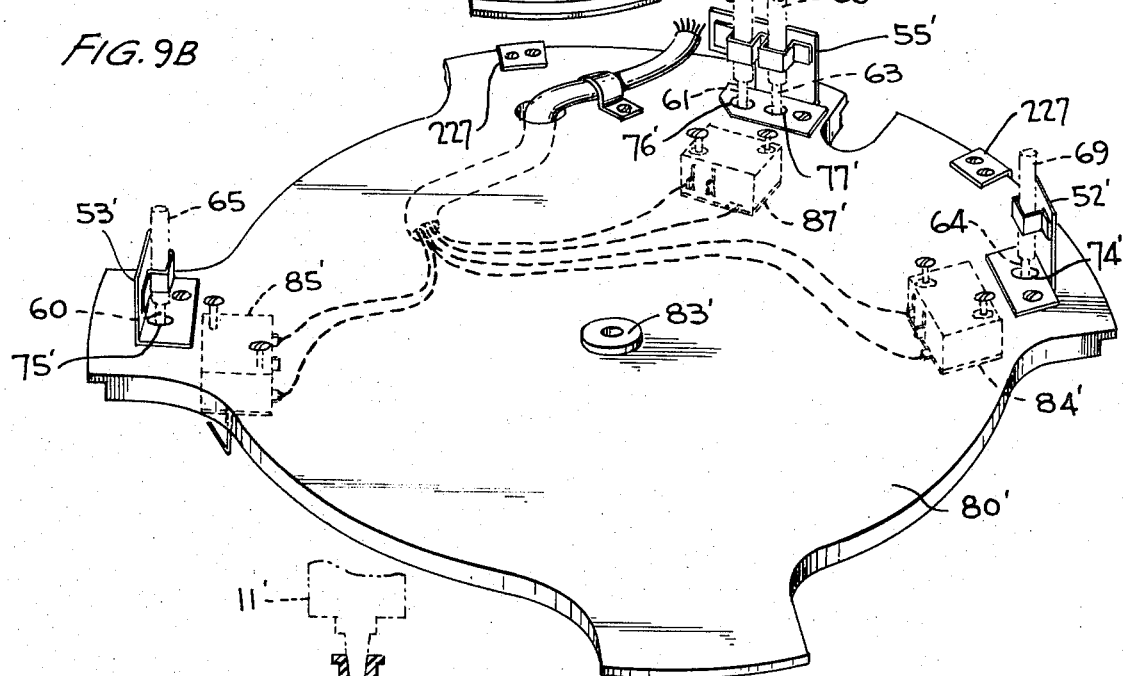
FIG. 9B is a top perspective view of the replacement cover plate of FIG. 9A showing the position of the various spout means which deliver the various reagents to the vials contained within the rotary table.

To accomplish this, the first embodiment of automated apparatus, as described previously, can be modified as follows:

The drive mechanism, including the 100 inch ounce synchronous motor 3 and gear train 5, is adjusted so that rotary table 40 rotates one revolution approximately every 15 minutes; switches 172, 225, and 226, in FIG. 8, are maintained in their opened position so that both the heating and a portion of the cooling structure are inoperative; fan 202 is rotated so that it performs as an exhaust rather than an input blower; venting enclosure 32 has its opening closed; cover plate 80 is removed and replaced by cover plate 80' shown in FIGS. 9A and 9B and described in more detail hereinafter; the pump assembly 4 can be inclined with the cams being at a lower level than the pumps so that the latter can be bled to expel air therefrom without the need of operating petcocks 127; the funnel reservoirs 11 are replaced by plastic disposable syringe reservoirs 11' (shown in FIG. 10); pump 118 and its associated solenoid controlled clutch 109 are made nonfunctional so that the base reagent will not be dispensed; and cam 112 is adjusted so that pump 116 is operated within 10 seconds (preferably 1 second) after the operation of pump 117.

Referring in particular to FIG. 9A, there is shown the bottom side of cover plate 80' which is adapted to be placed over rotary table 40 and attached to table housing 15 by clips 227. It contains a bearing 83' through which shaft 18 passes. Secured to the bottom side of cover plate 80', located around the periphery thereof, are three microswitches 84', 85' and 87'. Extending from each microswitch is an activation arm 88' for making contact with the top side of a vial as it passes thereunder in rotary table 40.

As illustrated in FIG. 9B, with some of the components shown in phantom for ease of illustration, secured to the top side of cover plate 80' are two single retaining members 52' and 53' and one double retaining member 55'. Single retaining members 52' and 53' are adapted to retain Teflon tubings 69 and 65, respectively, holding, in turn, spouts 64 and 60, respectively, such that spouts 64 and 60, although located on opposite sides of cover plate 80' from the microswitches, are positioned in close proximity with microswitches 84' and 85', respectively; and double retaining member 55' is adapted to retain Teflon tubings 67 and 68, holding, in turn, spouts 61 and 63, respectively, such that spouts 61 and 63, although located on the opposite side of cover plate 80' from microswitch 87', are positioned in close proximity therewith. Teflon tubings 69, 65, 67 and 68 connect, respectively, with pumps 120, 119, 117 and 116 via cooperating output nipples 133 thereof.

Spout apertures 74', 75' and 76' and 77', also in cover plate 80', are located such that spouts 64, 60, 61 and 63 cooperate with spout aperture 74', 75', 76' and 77', respectively, so that both the relationship between the spouts and the respective microswitches is maintained and the spouts are able to dispense the various reagents through the spout apertures, in proper sequence, into the vials as the vials pass thereunder, the dispensing of a respective reagent from each spout being controlled by a microswitch, with which a respective spout is associated, in the same manner as more fully described above in connection with the first embodiment.

For ease of understanding the relationship of loading chute 21, the various spouts 64, 60, 61 and 63, and the eject chute 22, with rotary table 40 making one revolution in 15 minutes, the following chart is presented.

|  | Degrees | Inches | Minutes |
| --- | --- | --- | --- |
| Loading chute 21 | 0 | 0 | 0 |
| Spout 64 | 6 | 1/2 | 1/4 |
| Spout 60 | 198 | 16 1/2 | 8 3/4 |
| Spout 61 | 312 | 26 | 13 3/4 |
| Spout 63 | 312 | 26 | *13 3/4 |
| Eject chute 22 | 330 | 27 1/2 | 14 1/2 |

*Plus 1 second.

Again, as described above in connection with the first embodiment, when the solenoid portion of a solenoid controlled clutch is energized by a signal coupled thereto from leads from cable 151, the cable being connected to microswitch solenoid interface jack 132, the clutch portion of the solenoid controlled clutch engages shaft 106, thereby rotating the cam connected to the clutch portion of the solenoid controlled clutch. In this embodiment, cams 112 and 111, operated by solenoid controlled clutches 107 and 108, respectively, as mentioned above, both cooperate with the same microswitch 87' (see FIGS. 9A and 9B) and are slightly offset with respect to each other to provide less than 10 seconds (preferably 1 second) time interval between dispensing from spouts 61 and 63, respectively, with which they cooperate. The other microswitches 84' and 85' cooperate with solenoid controlled clutches 95 and 110, respectively.

In this alternative embodiment, with each of the vials containing 0.1 ml. of urine sample, pump 120 dispenses, via spout 64, 0.02 ml. of 0.5% concentration Triton X-100 and potato apyrase solution; pump 119 dispenses, via spout 60, 0.02 ml. of .05 N perchloric acid; pump 117 dispenses, via spout 61, 0.02 ml. of 2.5 M tris (hydroxymethyl) aminomethane; and pump 116 dispense, via spout 63, 0.4 ml. of the luciferase-luciferin mixture containing magnesium.

With the automated apparatus set up as just described, its operation is substantially the same as that present above for the first embodiment except for the differences just pointed out—namely heating no longer being required, cooling materially reduced, and the time sequence modified.

The automated apparatus, while described in connection with urine analysis can also be used to detect and count bacteria in any source containing living organisms, such as, for example, water supplies. In addition, it can be used to test blood, spinal fluid, and other physiological fluids for bacterial content.

While essentially only two embodiments of the automated apparatus have been shown and described, it is apparent that many changes and modifications will occur to those skilled in the art without departing from the scope of the appended claims.

We claim:

1. An automated apparatus for sequentially treating and assaying samples carried in vials so as to effect and monitor a bioluminescent reaction indicative of the presence of microorganisms in the samples, said apparatus comprising, in combination: table means having a plurality of vial receiving means spaced from one another; means to rotate said table means; vial supply means for automatically feeding vials into said vial receiving means as said table means rotates; a plurality of reagent dispensing means spaced from one another and adapted to dispense reagents automatically and sequentially into each of the vials carried by said table means as said table means rotates; tripping means to activate respective ones of said plurality of reagent dispensing means when a vial is disposed thereunder; photo-detecting means located adjacent the last one of said plurality of reagent dispensing means for sequentially detecting light emitted from the sample in each respective vial, said last one of said plurality of reagent dispensing means being adapted to dispense a reagent into each of the vials such that the reagent reacts with the sample therein to cause a bioluminescent reaction, said photodetecting means detecting said bioluminescent reaction and furnishing an electrical signal proportional thereto; monitoring means coupled to said photodetecting means to receive said electrical signal; and vial unloading means for automatically removing each vial from said table means after the vial has passed said photodetecting means.

2. An apparatus as defined in claim 1, wherein said vial unloading means comprises a guide unit and a resilient member associated with said table means for ejecting the vials from said table means, said vial unloading means further including means for preventing any light emanating from an ejected vial from reaching the region of said photodetecting means.

3. An apparatus according to claim 1, wherein said supply means comprises a channel-shaped chute removably mounted in said apparatus so as to be inclined downwardly with respect to said table means, the vials being fed to said vial receiving means by said chute.

4. An apparatus as defined in claim 1, wherein at least the region whereat said photodetecting means is located and the light emission occurs is enclosed within a light-tight housing structured so as to not admit any stray light into said region, said housing including a shutter mechanism to permit selective entrance of light emission to said photodetecting means.

5. An apparatus as defined in claim 1, wherein said photodetecting means comprises a photo-multiplier unit.

6. An apparatus as defined in claim 1, further including separate and physically displaced heating and cooling means disposed adjacent said table means between selected ones of said reagent dispensing means for respectively heating and cooling the vials.

7. An apparatus as defined in claim 6, wherein said cooling means comprises a shroud mounted in said apparatus and includes a fan means adapted to circulate air external from said apparatus as a coolant for the vials after they have been previously heated by said heating means.

8. An apparatus as defined in claim 1, wherein the last one of said plurality of reagent dispensing means is comprised of two dispensing systems.

9. An apparatus as defined in claim 1, further including light-tight housing means therefor for preventing the entrance of stray light thereto.

10. An automated apparatus for sequentially testing and assaying a plurality of samples carried in vials so as to effect and monitor a bioluminescent reaction indicative of the presence of micro-organisms therein, said apparatus comprising, in combination, a transport means; a plurality of spaced vial receiving means located on said transport means, said transport means moving the spaced vials along a predetermined path of travel; vial loading means adjacent to said transport means for automatically feeding and loading vials thereon; a series of reagent dispensing means located along said predetermined path of travel of said vials, each one of said series of reagent dispensing means being spaced from an adjacent one a predetermined distance and having means for automatically and sequentially dispensing reagents into each of the vials; a photodetecting means located along said predetermined path of travel adjacent to the last one of said series of reagent dispensing means for measuring light emanating from the samples carried by the vials after said last one of said series of reagent dispensing means has deposited a reagent into said vial; said means for automatically and sequentially dispensing reagents including tripping means actuated when a vial is disposed under a respective one of said series of reagent dispensing means; and vial unloading means located along said predetermined path of travel a predetermined distance from said last one of said series of reagent dispensing means for automatically unloading the vials after they have travelled past said last one of said series of reagent dispensing means.

11. An apparatus as defined in claim 10, wherein at least the region whereat said photodetecting means is located and light emission occurs is enclosed within a housing structured so as to not admit any stray light into said region, said housing including a mechanism to permit selective entrance of said light emission into said photodetecting means.

12. An apparatus as defined in claim 10, wherein said vial loading means comprises a channel-shaped chute removably mounted in said apparatus so as to be inclined downwardly with respect to said transport means, said chute feeding the vials to said transport means.

13. An apparatus as defined in claim 10, wherein said vial unloading means comprises a guide unit and a resilient member associated with said transport means for ejecting the vials from said transport means, said vial unloading means further including means for preventing any light emanating from an ejected vial from reaching the region of said photodetecting means.

14. An apparatus as defined in claim 10, further including separate and physically displaced heating and cooling means disposed adjacent said transport means between selected ones of said reagent dispensing means for respectively heating and cooling the vials.

15. An apparatus as defined in claim 10, further including light-tight housing means for preventing the entrance of stray light thereto.

References Cited
UNITED STATES PATENTS

| | | | |
|---|---|---|---|
| 3,219,416 | 11/1965 | Natelson | 23—253 R |
| 3,542,515 | 11/1970 | Scott | 195—103.5 R |
| 3,322,958 | 5/1967 | Heiss | 23—253 R |
| 3,520,660 | 7/1970 | Webb | 195—127 |

ALVIN E. TANENHOLTZ, Primary Examiner

U.S. Cl. X.R.

195—103.5 R; 23—253 R; 356—246